(12) United States Patent
Noh

(10) Patent No.: US 6,392,878 B1
(45) Date of Patent: *May 21, 2002

(54) DISK DRIVE APPARATUS HAVING BODY, COVER AND FRONT WALL

(75) Inventor: Su-Hyeon Noh, Kyunggi-do (KR)

(73) Assignee: SamSung Electronics, Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/525,327

(22) Filed: Mar. 13, 2000

(30) Foreign Application Priority Data

Mar. 13, 1999 (KR) .............................. 99-8510

(51) Int. Cl.⁷ .............................. G06F 1/16; H05K 7/02
(52) U.S. Cl. ...................................... 361/685; 361/728
(58) Field of Search ............................... 361/683–686, 361/728–733, 735, 752

(56) References Cited

U.S. PATENT DOCUMENTS

| | | | | |
|---|---|---|---|---|
| 4,672,510 A | * | 6/1987 | Castner | 361/415 |
| 5,349,483 A | * | 9/1994 | Tsai | 360/97.01 |
| 5,563,767 A | * | 10/1996 | Chen | 361/685 |
| 5,583,745 A | * | 12/1996 | Uwabo et al. | 361/685 |
| 5,668,697 A | * | 9/1997 | Dowdy | 361/685 |
| 5,764,481 A | | 6/1998 | Ruch et al. | |
| 5,886,869 A | * | 3/1999 | Fussell et al. | 361/685 |
| 5,995,363 A | * | 11/1999 | Wu | 361/679 |
| 6,011,687 A | | 1/2000 | Gluskoter et al. | |

* cited by examiner

Primary Examiner—Lynn D. Feild
(74) Attorney, Agent, or Firm—Robert E. Bushnell, Esq.

(57) ABSTRACT

The present invention relates to a storage apparatus of the computer, especially a floppy disk drive apparatus or a CD-ROM drive apparatus. A disk drive apparatus, comprises a disk drive, a body for incorporating the disk drive, wherein the body includes two side surfaces, a bottom surface connecting to the two side surfaces, a rear surface coupling the bottom surface and the two side surfaces, a cover for coupling the body, wherein the cover includes two side surfaces and an upper surface connecting to the two side surfaces, a front wall formed at the cover, wherein the front wall and the cover are formed in one body, and wherein the front wall is formed to be coupled to the upper surface of the cover, a hook formed at either of the two side surfaces of the body or the two side surfaces of the cover; and a seat formed at either of the two side surface of the body or the two side surfaces of the cover.

16 Claims, 8 Drawing Sheets

DISK DRIVE APPARATUS HAVING BODY, COVER AND FRONT WALL

CLAIM OF PRIORITY

This application makes reference to, incorporates the same herein, and claims all benefits accruing under 35 U.S.C §119 from an application entitled Disk Drive Apparatus earlier filed in the Korean Industrial Property Office on Mar. 13, 1999, and there duly assigned Serial No. 99-8510 by that Office.

FIELD OF THE INVENTION

The present invention relates to a computer, and in particular to a storage apparatus of the computer, especially a floppy disk drive apparatus or a CD-ROM drive apparatus, which is used in a portable computer such as a notebook computer.

BACKGROUND OF THE INVENTION

It is well known in the art to enhance the convenience of using a portable, notebook, or laptop computers and even some docking stations, also known as computer systems, by providing expansion bays for receiving CD-ROM drives, floppy disk drives or hard disk drives, also known as removable media modules.

An advantage to of using such removable media modules is the ability to transfer large amounts of data from on computer system to another computer system, an increase in data security by removing the media modules from the computer system, and making the computer systems more compact, especially convenient to portable computer systems.

To increase compactness in, for example, portable computers, recent practice is to reduce the number of bays provided for receiving the media modules components by making the media modules interchangeable for insertion into a single bay, for example.

The interchangeable media modules a housings and inner components which are fixed, or coupled, to each other by using of a plurality of screws the usage of a plurality of screws during an assembly process of the media modules results in a long assembly time, which cause production costs to be high. In addition, a use of a large number of screws may increase the possibility of damaging the components of the media modules, especially the body and the cover of the housing, thus lowering the quality of the resulting media modules. Also, a front wall, formed at the front surface of the media modules may be formed of a fragile material and structure, particularly around the opening of the front wall through which a memory media is inserted into the media modules, such as a CD-ROM drive or a floppy disk drive. Even more a portion wherein the ejecting button of a floppy disk drive, for example, would be placed may be relatively much more fragile, therefore, this part of the housing is quite susceptible to some damage.

Incorporated herein by reference are the following patents describing some known removable media modules: U.S. Pat. No. 5,764,481 to Mark H. Ruch et al. entitled Computer Docking Station With Half-Height Bays And Associated Security System; U.S. Pat. No. 5,886,869 to Derrill J. Fussell et al. entitled Adaptor Sleeve For Portable Hard Drive; and U.S. Pat. No. 6,011,687 to Steve Gluskoter et al. entitled Docking Station Adapter For Computer Media Modules.

SUMMARY OF THE INVENTION

It is an object of the present invention to provide a media module (referred to hereafter as disk drive apparatus) especially, a floppy disk drive or a CD-ROM drive, capable of being easily assembled using few screws.

According to the primary objective of the invention, a disk drive apparatus, comprises a disk drive, a body for incorporating the disk drive, wherein the body includes two side surfaces, a bottom surface connecting to two side surfaces, a rear surface coupling the bottom surface and two side surfaces, a cover for coupling the body, wherein the cover includes two side surfaces and an upper surface connecting to two side surfaces of the cover, a front wall formed at the cover, wherein the front wall and the cover are formed in one body, and wherein the front wall is formed to be coupled to the upper surface of the cover, a hook formed at either of the two side surfaces of the body or the two side surfaces of the cover; and a seat formed at either of the two side surface of the body or the two side surfaces of the cover.

In the disk drive apparatus according to the invention, the disk drive apparatus further includes at least one rib formed on inner surface of the body to contact with outer surface of the disk drive, wherein the at least one rib compels the inner surface of the body to be contacted with the is outer surface of the disk drive.

Furthermore, in the disk drive apparatus according to the invention, the disk drive apparatus further includes an interface board having a first surface, a second surface, a first connector and a second connector, and wherein the first surface and the second surface is located in parallel, and wherein the first connector is attached on the first surface to be connected with the disk drive, and wherein the second connectors is attached on the second surface to be connected with an outer electronic device, and wherein the first and the second surface is disposed to be parallel with the rear surface of the body.

Still furthermore, in the disk drive apparatus according to the invention, the hook is formed adjacent to a front portion of each of the two side surfaces.

Still furthermore, in the disk drive apparatus according to the invention, the seat is formed corresponding to the location of the hook.

Still furthermore, in the disk drive apparatus according to the invention, the body includes at least one boss formed on the bottom surface of the body.

Still furthermore, in the disk drive apparatus according to the invention, the cover includes at least one hole formed on the upper surface of the cover corresponding to the location of the at least one boss.

Still furthermore, in the disk drive apparatus according to the invention, the body is coupled to the cover by using screws passing through the at least one hole of the cover to be fixed to the at least one boss of the body and the coupling of the hook and the seat.

The present invention will be better understood from the following detailed description of the exemplary embodiment thereof taken in conjunction with the accompanying drawings, and its scope will be pointed out in the appended claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

It should be understood that the description of this preferred embodiment is merely illustrative and that it should not be taken in a limiting sense. In the following detailed description, several specific details are set forth in order to provide a thorough understanding of the present invention. It will be obvious, however, to one skilled in the art that the present invention may be practiced without these specific details.

Figure 1:
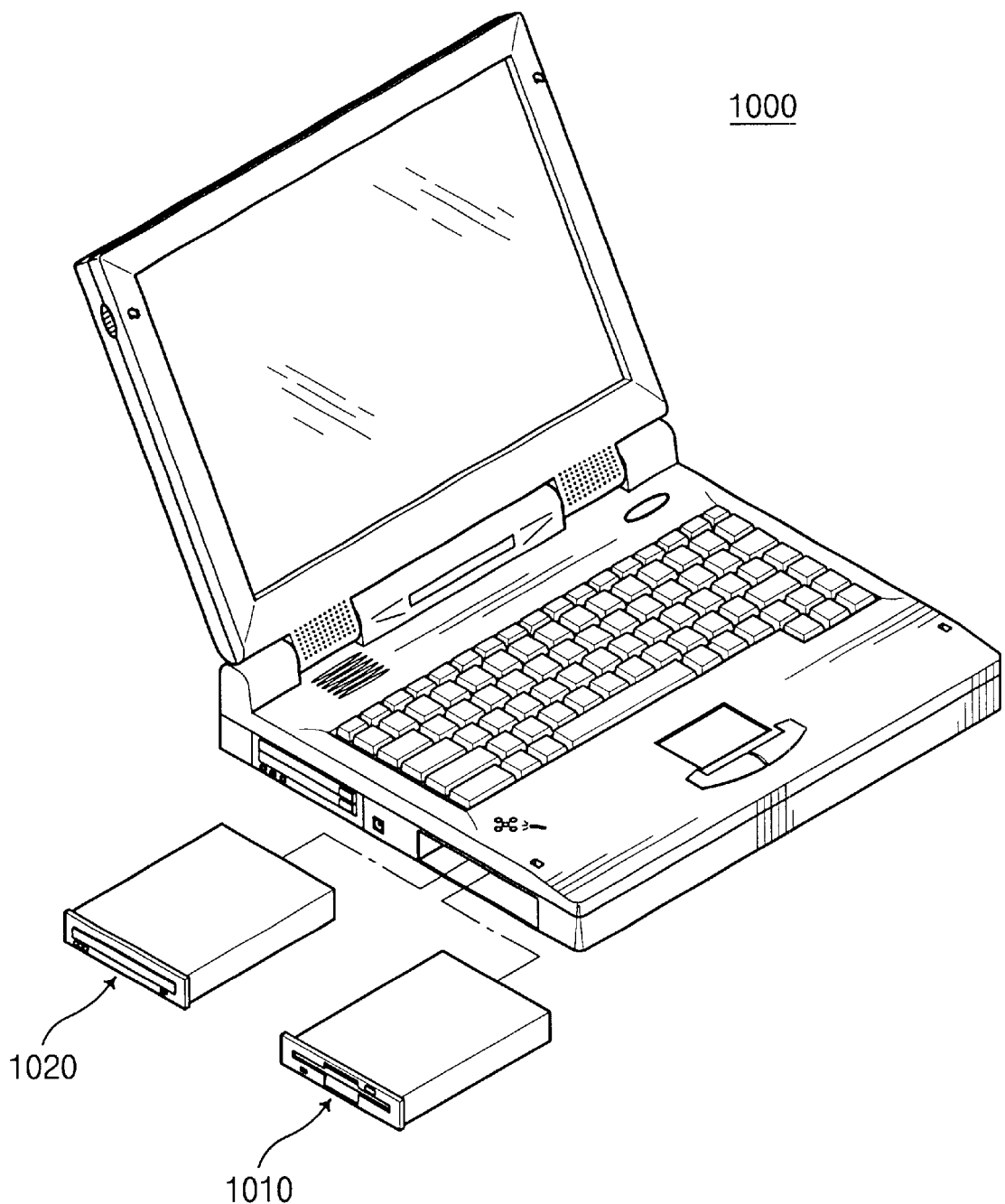
FIG. 1 is a perspective view of a portable computer using the disk drive apparatus.

As illustrated in FIG. 1, a floppy disk drive apparatus 1010 and a CD-ROM drive apparatus 1020 are able to share an expansion bay in a notebook computer 1000. Recent notebook computer generally includes a common expansion bay to save inner space of the portable computer.

Figure 2:
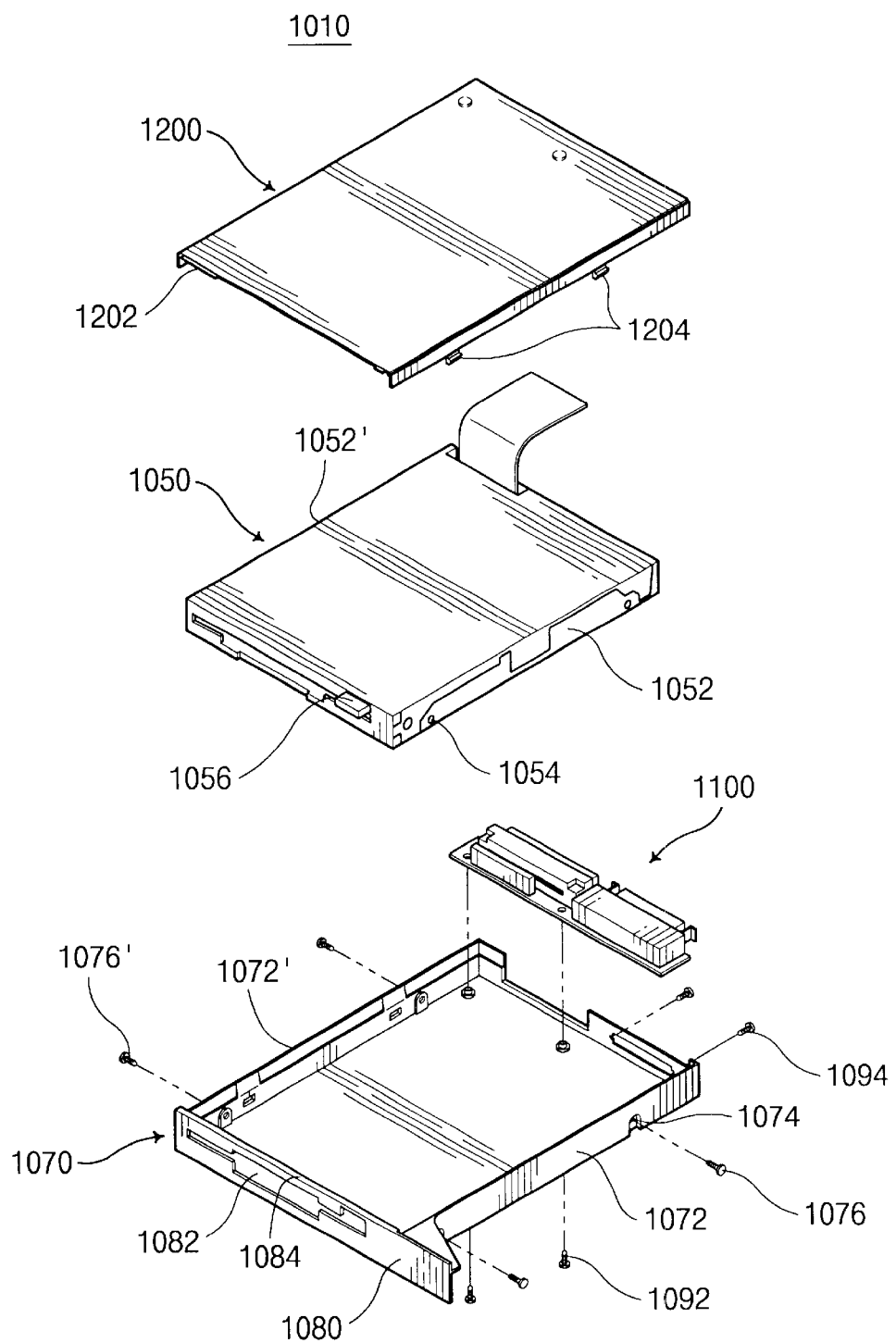
FIG. 2 is a perspective exploded view showing an exemplary floppy disk drive apparatus.
Figure 3:
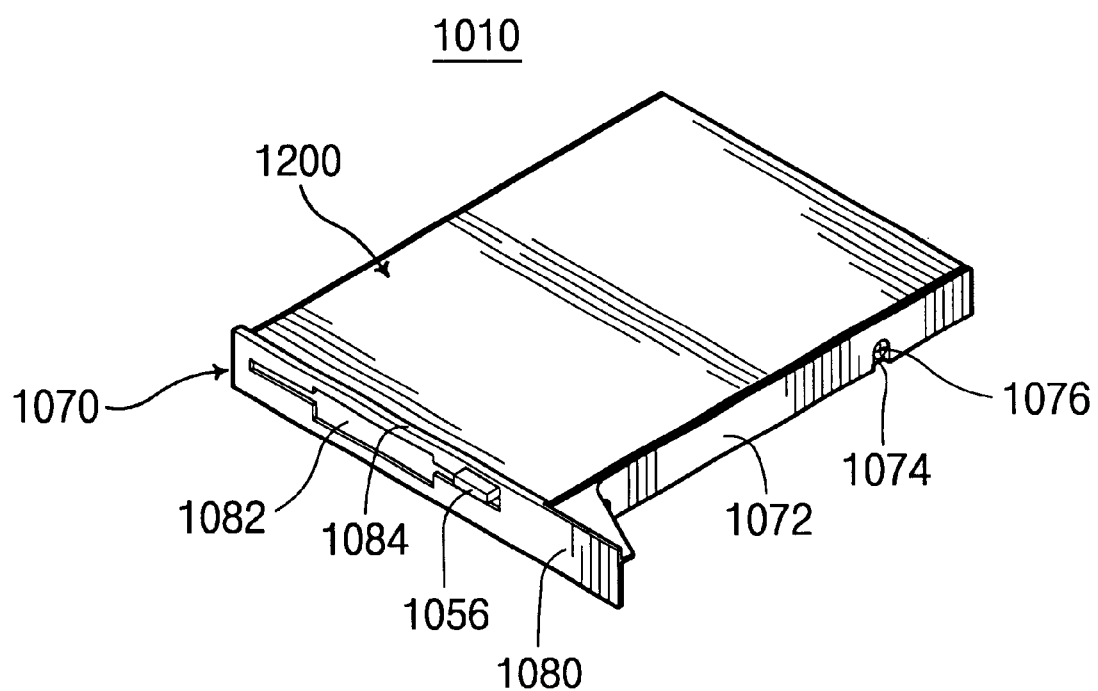
FIG. 3 is an assembly view of FIG. 2.
Figure 4:
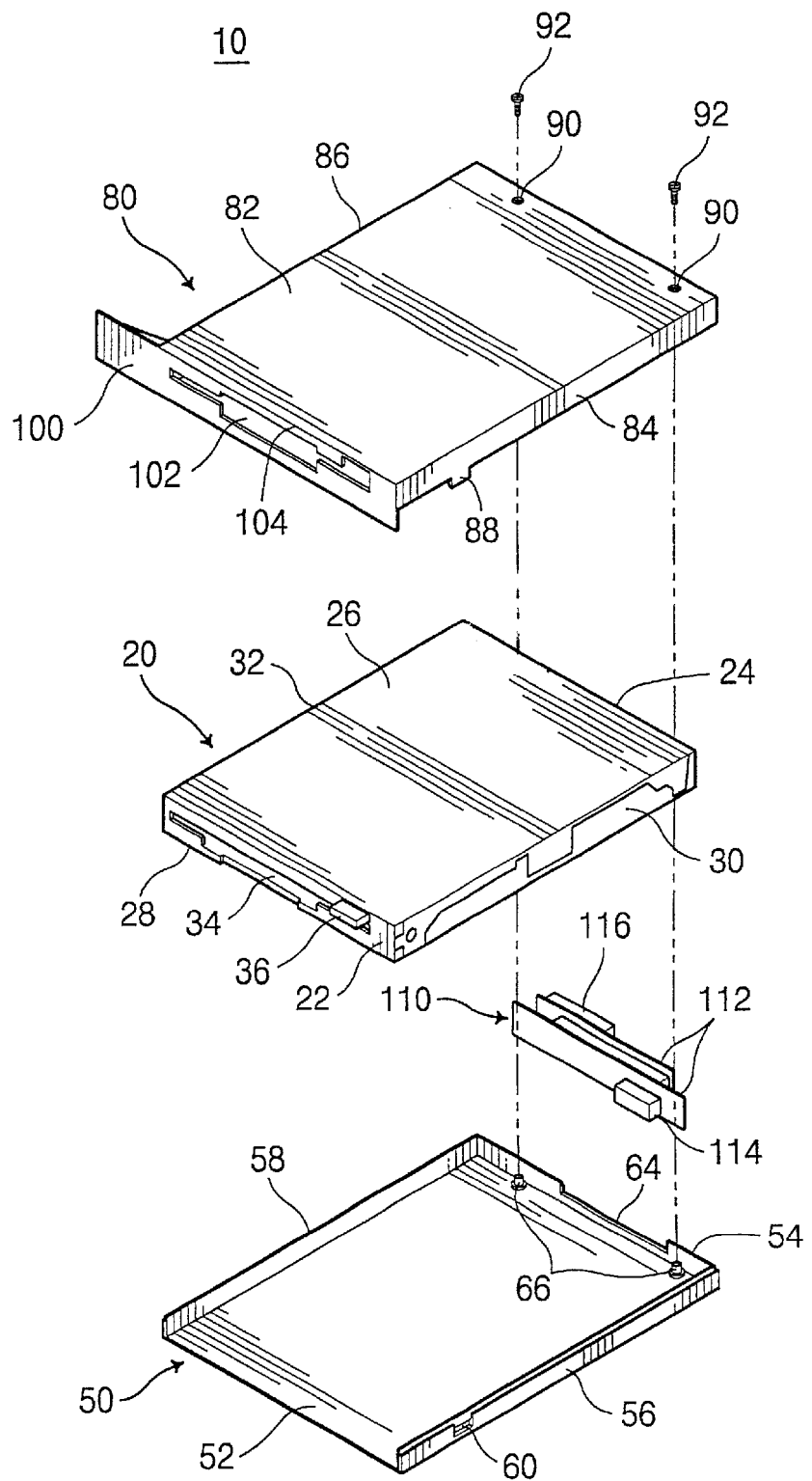
FIG. 4 is a perspective exploded view of floppy disk drive apparatus in accordance with the first preferred embodiment of the present invention.

FIG. 2 and FIG. 3 show the disk drive apparatus 1010.

With reference to FIG. 2 and FIG. 3, the floppy disk drive apparatus 1010 is composed of a floppy disk drive 1050, an interface board 1100, a body 1070 and a cover 1200. The body 1070 includes two side walls 1072, 1072' having screw holes 1074 thereon and a front wall 1080. The screw holes 1074 of two side walls 1072, 1072' are formed to be coupled with screw holes 1054 of two sides wall 1052, 1052' of the floppy disk drive 1050. In the front wall an opening is formed to access the floppy disk (not illustrated). An ejecting button 1056 of the floppy disk drive 1050 is protruded through the opening 1082 formed on a surface of the front wall 1080. The floppy disk drive 1050 is fixed to the body 1070 with a plurality of screws 1076 through screw holes 1074 of two side walls 1072, 1072' of the body 1070 and screw holes 1054 of floppy disk drive 1050.

The interface board 1100 is placed inside of the body 1070 and it is coupled to the body 1070 by screws 1094 and screws 1092. In this state, screws 1094 are coupled to the interface board 1100 from a rear direction, and screws 1092 are coupled to the interface board 1100 from a bottom direction and fixed to the cover 1200. The cover 1200 is coupled to the body 1070 by protuberances, or tabs, 1202 and hooks 1024 and then fixed to the body 1070 by screws 1092 coupled from the bottom surface of the body 1070.

The front wall 1080, formed at the front surface of the disk drive apparatus is formed from a fragile material, particularly the upper surface 1084 of the opening portion 1082. Even more, a portion wherein the ejecting button 1056 of the floppy disk drive 1050 would be placed is relatively much more fragile, therefore, this part is at some risk of being damaged.

The preferred embodiment will be described referring to FIG. 4 through FIG. 9. Also components of the present invention conducting same functions in the figures would be used the same reference number.

Figure 5:
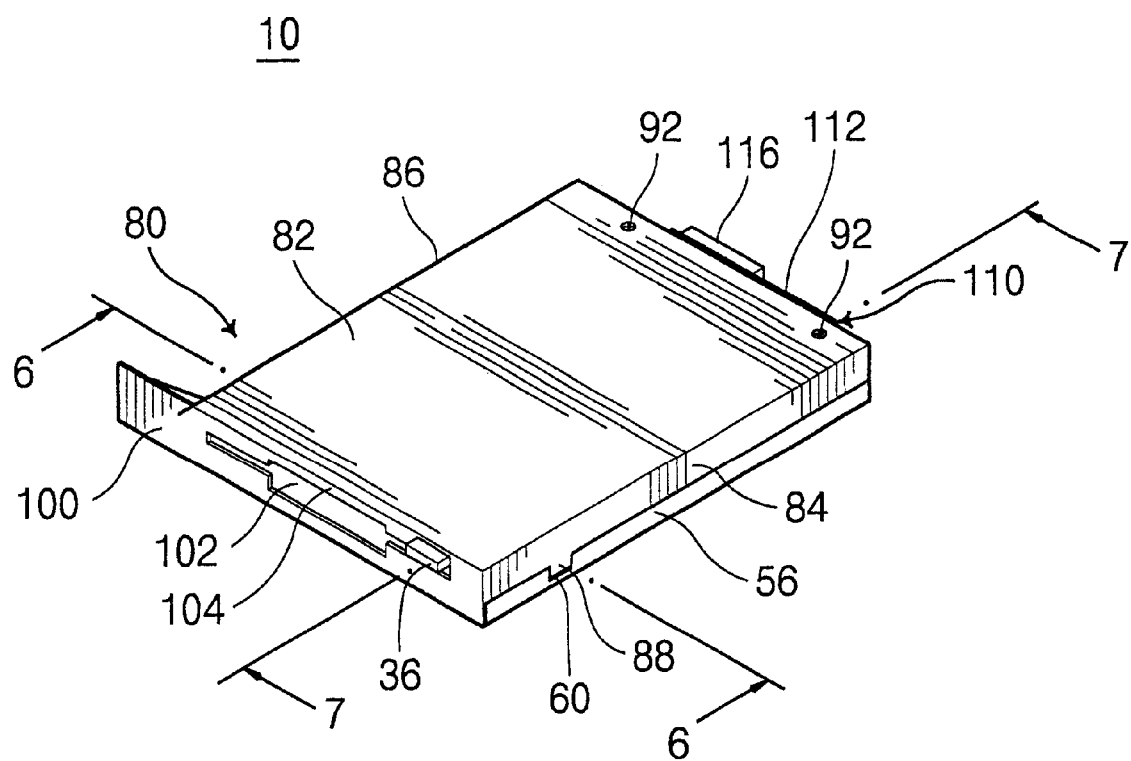
FIG. 5 is a assembly view of FIG. 4.
Figure 6:
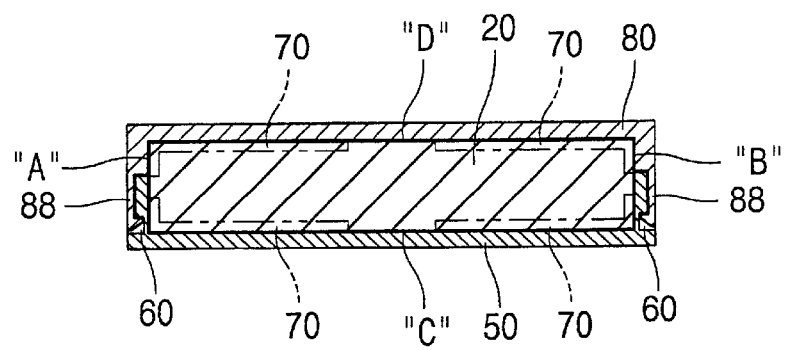
FIG. 6 is a cross-sectional view taken along a line 6—6 in FIG. 5.
Figure 7:
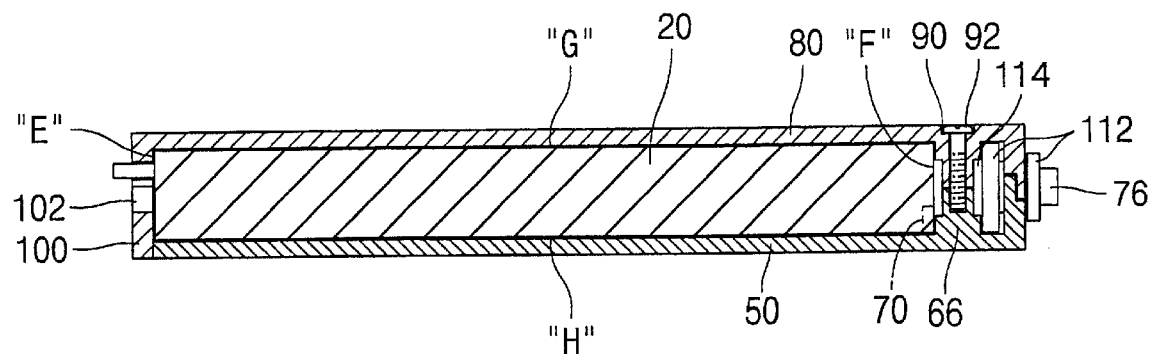
FIG. 7 is a cross-sectional view taken along a line 7—7 in FIG. 5.

FIG. 5 through FIG. 7 illustrate the floppy disk drive apparatus 10 according to the first preferred embodiment of the present invention.

Referring to FIG. 5 through FIG. 7, a floppy disk drive apparatus 10 has a floppy disk drive 20, a body 50 and cover 80. As known well to the skilled in this field, the floppy disk drive 20 is structured to access a floppy disk (not illustrated). The floppy disk drive 20 is formed as a hexahedron. This floppy disk drive has a front surface 22 and a rear surface 24 forming a length, an upper surface 26 and a bottom surface 28 forming a height thereof and a right surface 30 and a left surface 32 forming a width thereof. In this floppy disk drive 20, an opening 34 is formed to access a floppy disk at the front surface 22 and an ejecting button 36 is formed to eject the inserted floppy disk. This floppy disk drive 20 is coupled with the interface board 110 at the rear surface 24. The floppy disk drive 20 is placed inside of the body 50.

The body 50 has a bottom surface 52, a rear surface 54 and two sides 56, 58 in order to receive the floppy disk drive 20. The body 50 is made of metal or plastic. An opening 64 is formed in order for the interface board 110 to be exposed from inside to outside of the rear surface 54. The interface board 110 equips a connector 114 coupled to the floppy disk drive apparatus 20 and a connector 116 coupled to an exterior electronic device (not illustrated) such as a main board of computer. The board 112 of the interface board 110 is placed on the rear surface 54 of the body being parallel with the rear surface 24 of the body and coupled each other. Connectors 114,116 installed in the board 112 are installed at the right angle to the board 112. The sidewalls 56, 58 of body 50 each include a seat 60 which is placed toward the front of body 50. Screw bosses 66 extend vertically upward from bottom surface 52 adjacent to the rear portion body 50.

The cover 80 has an upper surface 82 and two sides 84,86. Toward the rear portion of the upper surface 82 of cover 80 are screw holes 90 corresponding with the screw bosses 66 formed on the bottom surface 52 of the body 50. In addition, on the two sides 84,86 of cover 80 are hooks 88 formed to be coupled to seats 60 in sides 56, 58 of the body 50.

The body 50 and the cover 80 are joined with the plurality of the seats 60 and plurality of the hooks 88 and fixed together by two screws 92 through the rear portion of cover 80 and into bosses 66. Consequently, the number of screws used compared to those of FIG. 2 is significantly reduced. At the same time, although seats 60 are shown formed in the surface the sides 56, 58 of body 50 and hooks 88 protrude from the sides 84, 86 of cover 80, on the contrary, hooks 88 can be formed to protrude from sides 56, 58 of body 50 and seats 60 can be formed in the surface of sides 84, 86 of cover 80.

Additionally, a front wall 100 is formed on the front surface of the cover 80, and the cover 80 and the front wall 100 is one integral body, in the preferred embodiment. This structure helps strengthen upper portion 104 of front wall 100.

Referring to FIG. 6 and FIG. 7, as aforementioned, the floppy disk drive apparatus 10 according to the preferred embodiment of the invention is composed of the floppy disk drive 20 where a cavity, or interior space, is provided by the body 50 and the cover 80. And the body 50 and the cover 80 are joined by seats 60 coupled to hooks 88 and by the two screws 92. The floppy disk drive 20 is adhered to cavity formed by the joined body 50 and 80 so that it will not move. When an interval, or gap, is formed between the surfaces forming the cavity and the exterior sides A,B, C,D,E,F,G,H of the floppy disk drive 20, ribs 70 my be provided to reduce, or narrow, these gaps.

Figure 8:
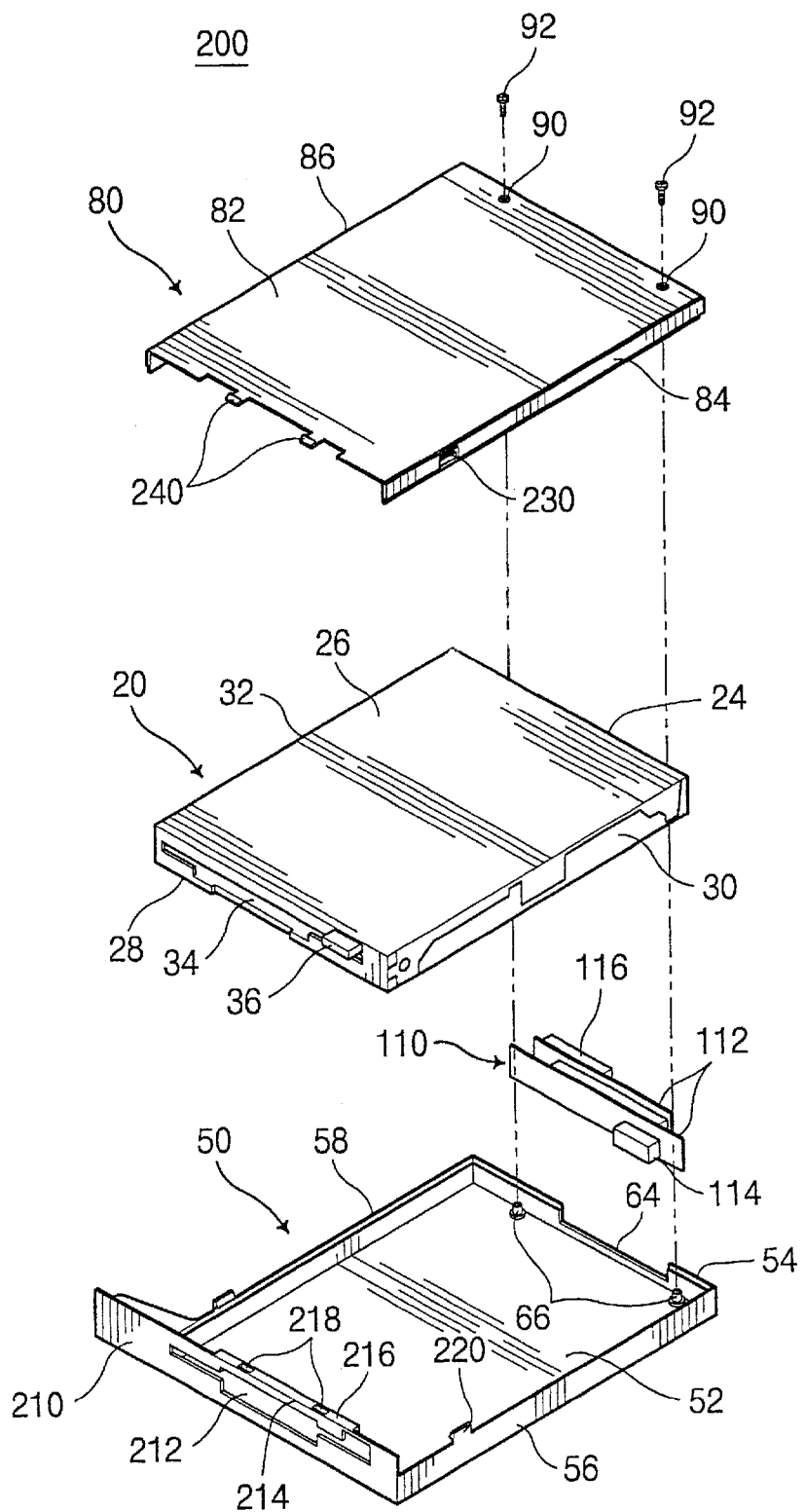
FIG. 8 is a perspective exploded view of the floppy disk drive which was used in the second preferred embodiment of this invention.
Figure 9:
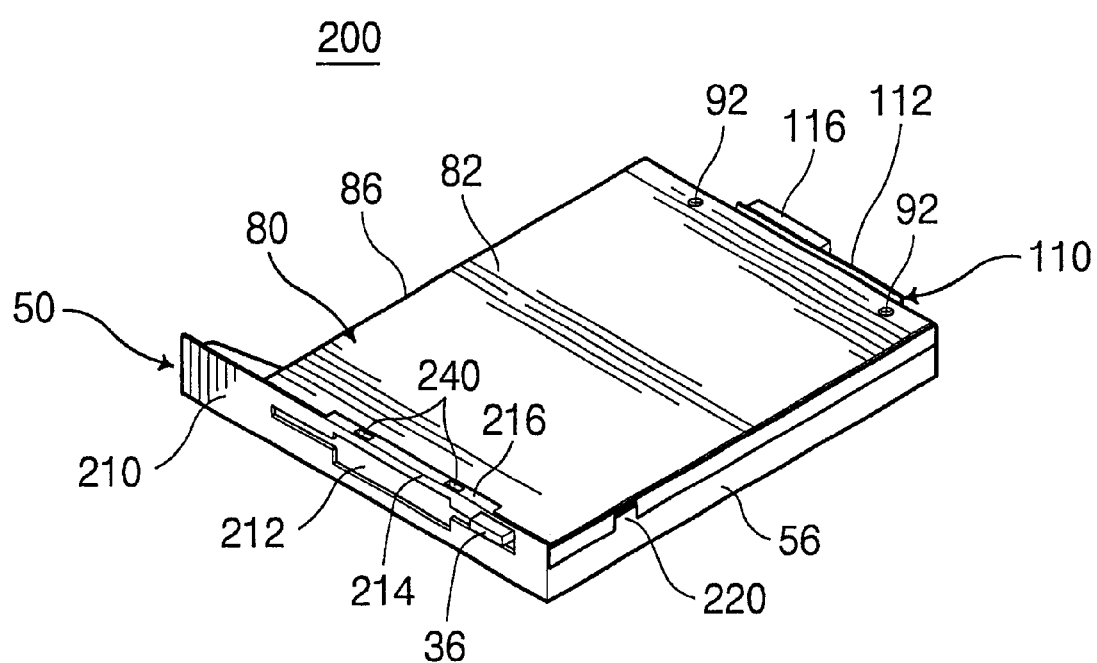
FIG. 9 is an assembly view of FIG. 8.

FIG. 8 and FIG. 9 are showing the floppy disk drive apparatus 200 according to the second preferred embodiment of the invention.

With reference to FIG. 8 and FIG. 9, the floppy disk drive apparatus 200 according to the second preferred embodiment includes, as stated in the floppy disk drive apparatus 10 of the first preferred embodiment, a floppy disk drive 20, a body 50 and a cover 80. Therefore, the detailed explanation about the same structure would not be stated.

The floppy disk drive apparatus 200 according to the second preferred embodiment differs from the floppy disk drive apparatus 10 of the first embodiment by having a front wall 210 forming a front surface of body 50. The front wall 210 has an opening 212 to access a floppy disk into the floppy disk drive 20. And also, on the upper surface 214 of the opening 212 in front wall 210 an extending component 216 is formed protruding towards the rear of the body 50. This structure helps strengthen upper portion 214 of front wall 210.

A plurality of seats 218 are formed on the extending component 216. On the two sides 56, 58 of the body 50 hooks 220 are formed extending in the vertical direction. On the front surface of the cover 80 a plurality of hooks 240 are formed extending toward the front of the cover 80 from upper surface 82. The hooks 240 are formed to be coupled correspondingly with the seats 218 of the extended component 216 of body 50. In addition, on two sides 84, 86 of cover 80, a plurality of seats 230 are formed to be coupled with hooks 220 of body 50.

The present invention helps decrease a number of screws in producing the apparatus so that it can prevent from labor and time consuming. And also, as being decreased a number of screw, the disassembled screws may be reduced and relatively the credibility of the product can be maintained. In addition, in case the front wall is formed on the cover in a body, upper portion of the opening can be strengthened more effective as previous.

Although the preferred embodiments of the present invention have been disclosed for a illustrative purposes, those skilled in the art will appreciate that various modifications, additions and substitutions are possible, without departing from the scope and spirit of the invention as described in the accompanying claims.

What is claimed is:

1. A disk drive apparatus for a portable computer, comprising:
   a disk drive;
   a body for incorporating the disk drive, wherein the body includes two side surfaces, a bottom surface connecting to the two side surfaces, a rear surface coupling the bottom surface and the two side surfaces;
   a cover for coupling the body, wherein the cover includes two side surfaces and an upper surface connecting to the two side surfaces;
   a front wall formed at a front portion of the cover, wherein the front wall and the cover are formed in one body, said front wall having an opening therein for enabling a storage medium to be inserted into said disk drive;
   no more than two hooks formed to extend vertically above the two side surfaces of the body or to extend vertically below the two side surfaces of the cover;
   no more than two seats formed in the two side surface of the body or in the two side surfaces of the cover, said seats being formed to mate with said hooks; and
   no more than two screws, said screws being utilized to secure the cover to the body, wherein the body includes no more than two bosses formed on the bottom surface of the body for receiving said screws and the cover includes no more than two screw holes formed through the upper surface of the cover corresponding to the location of the bosses.

2. The disk drive apparatus of claim 1, further including an interface board having a first surface, a second surface, a first connector and a second connector, and wherein the first surface and the second surface are located in parallel, and wherein the first connector is attached on the first surface to be connected with the disk drive, and wherein the second connector is attached on the second surface to be connected with an outer electronic device, and wherein the first surface and the second surface are disposed to be parallel with the rear surface of the body.

3. The disk drive apparatus of claim 1, wherein said hooks are formed adjacent to a front portion of each of the two side surfaces of said cover or adjacent to a front portion of each of the two side surfaces of said body.

4. A disk drive apparatus for a portable computer, comprising:
   a disk drive;
   a body for incorporating the disk drive, wherein the body includes two side surfaces, a bottom surface connecting to the two side surfaces, a rear surface coupling the bottom surface and the two side surfaces, and at least one rib formed on an inner surface of the body to contact with an outer surface of the disk drive, wherein the at least one rib compels the inner surface of the body to be contacted with the outer surface of the disk drive;
   a cover for coupling the body, wherein the cover includes two side surfaces and an upper surface connecting to the two side surfaces;
   a front wall formed at a front portion of the cover, wherein the front wall and the cover are formed in one body;
   a hook formed at either of the two side surfaces of the body or the two side surfaces of the cover; and
   a seat formed at either of the two side surface of the body or the two side surfaces of the cover.

5. A disk drive apparatus for a portable computer, comprising:
   a disk drive;
   a body for incorporating the disk drive, wherein the body includes two side surfaces, a bottom surface connecting to the two side surfaces, a rear surface coupling the bottom surface and the two side surfaces;
   a cover for coupling the body, wherein the cover includes two side surfaces and an upper surface connecting to the two side surfaces;
   a front wall formed at a front portion of the body, wherein the front wall and the body are formed in one body, said front wall having an extending portion extending orthogonally from said front wall; and
   a pair of hooks formed at a front portion of the cover, and extending horizontally from the front portion of the cover, for connection to a pair of seats formed in said extending portion.

6. The disk drive apparatus of claim 5, further comprising no more than two screws, said screws being utilized to secure the cover to the body.

7. The disk drive apparatus of claim 5, further including at least one rib formed on an inner surface of the body to contact with an outer surface of the disk drive, wherein the at least one rib compels the inner surface of the body to be contacted with the outer surface of the disk drive.

8. A disk drive apparatus for a portable computer, comprising:

a disk drive;

an interface board;

a housing for enclosing said disk drive, said housing comprising:

a body having bottom surface, two side walls and a rear wall, said rear wall having a cavity in which said interface board is mounted, wherein each of said side walls has only a single seat formed therein, each seat being disposed near a front portion of said body;

a cover having a front wall, an upper surface and two sidewalls, said front wall having an opening for providing access to said disk drive, and each sidewall includes only a single hook for mating with said seats of said side walls of said body, said hooks extending vertically below the sidewalls of said cover; and no more than two screws for securing said cover to said body, wherein said bottom surface of said body includes no more than two bosses extending vertically upward from said bottom surface for receiving said screws.

9. The disk drive apparatus as set forth in claim 8, wherein said bosses are formed adjacent to said rear wall of said body.

10. The disk drive apparatus as set forth in claim 8, wherein said disk drive is a hexahedron and a cavity in said housing, formed by connecting said body and said cover, contacts all sides of said hexahedron.

11. The disk drive apparatus as set forth in claim 10, wherein said housing further comprises a plurality of ribs formed on said body and said cover and each of said ribs is in contact with said disk drive.

12. A disk drive apparatus for a portable computer, comprising:

a disk drive;

an interface board;

a housing for enclosing said disk drive, said housing comprising:

a body having bottom surface, two side walls, a front wall and a rear wall, said front wall having an opening for accessing said disk drive and said rear wall having a cavity in which said interface board is mounted, wherein each of said side walls has only a single hook extending vertically upward above said side walls and near said front wall of said body;

a cover having a rear wall, an upper surface and two sidewalls, wherein each sidewall includes only a single seat for mating receiving said hooks of said side walls of said body;

a pair of hooks extending horizontally from a front portion of said upper surface of said cover; and an extension having a pair of seats for matingly receiving said pair of hooks, said extension being integrally formed with said front wall of said body and extending in a rearward direction from said front wall.

13. The disk drive apparatus as set forth in claim 12, further comprising no more than two screws for securing said cover to said body.

14. The disk drive apparatus as set forth in claim 13, wherein said bottom surface of said body includes no more than two bosses extending vertically upward from said bottom surface for receiving said screws.

15. The disk drive apparatus as set forth in claim 14, wherein said bosses are formed adjacent to said rear wall of said body.

16. The disk drive apparatus as set forth in claim 12, wherein said disk drive is a hexahedron, and a cavity in said housing, formed by connecting said body and said cover, contacts all sides of said hexahedron.

* * * * *